United States Patent
Tang

(10) Patent No.: US 8,687,882 B2
(45) Date of Patent: Apr. 1, 2014

(54) APPARATUS, AND ASSOCIATED METHOD, FOR FACILITATING WHITE BALANCING OF AN IMAGE

(75) Inventor: Sui Tong Tang, Waterloo (CA)

(73) Assignee: BlackBerry Limited, Waterloo (CA)

( * ) Notice: Subject to any disclaimer, the term of this patent is extended or adjusted under 35 U.S.C. 154(b) by 179 days.

(21) Appl. No.: 13/336,109

(22) Filed: Dec. 23, 2011

(65) Prior Publication Data
US 2013/0163866 A1  Jun. 27, 2013

(51) Int. Cl.
*G06K 9/00* (2006.01)

(52) U.S. Cl.
USPC .......................................... 382/167

(58) Field of Classification Search
USPC .......... 382/162, 167, 312; 348/210.99, 223.1, 348/225.1; 358/516, 518; 362/230, 231; 257/59, 72, 440, 445
See application file for complete search history.

(56) References Cited

U.S. PATENT DOCUMENTS

| | | | |
|---|---|---|---|
| 7,476,904 B2 * | 1/2009 | Fukunaga | 257/80 |
| 7,750,359 B2 * | 7/2010 | Narendran et al. | 257/98 |
| 8,269,302 B2 * | 9/2012 | Tian et al. | 257/440 |
| 8,272,758 B2 * | 9/2012 | Meir et al. | 362/231 |

* cited by examiner

Primary Examiner — Jose Couso

(57) ABSTRACT

An apparatus, and an associated method, facilitates selection of white balancing to adjust the color cast of a captured image. A quantum dot element is positioned to receive incident light associated with a scene forming an image that is to be captured. Incident light upon the quantum dot element causes photonic emissions that are detected and converted into electrical form. The electrical representations of the photonic images are used to measure or determine a color ratio. The value of the color ratio is utilized to select white balancing of a captured image, captured either prior to, concurrent with, or subsequent to, the color-ratio determination.

18 Claims, 4 Drawing Sheets

APPARATUS, AND ASSOCIATED METHOD, FOR FACILITATING WHITE BALANCING OF AN IMAGE

The present disclosure relates generally to a manner by which to white balance a photographic or other captured image such as still pictures or video. More particularly, the present disclosure relates to an apparatus, and an associated method, by which to obtain a color response provided by a quantum dot (QD) element that is provided with incident light associated with the image. The color response is measured and used to select the white balancing that is to be applied to the image.

Selection of white balancing is made based upon a quantitative measurement that is representative of the color of the incident light.

BACKGROUND

Recent years have witnessed many changes permitted as a result of advancements in technology. For example, new services that take advantage of such technological advancements are now available and are used by many.

New communication services, for instance, take advantage of such advancements in technology. Cellular communication services provided by use of cellular communication systems are exemplary of new communication services that make use of advancements in technology. Successive generations of cellular communication systems have been developed and deployed with each generation providing improved communication services and capabilities over prior generations. Various other radio communication systems have been developed and deployed that provide the advantages of cellular communication systems. These communication systems provide significant data communication capabilities.

Typically, communications by way of a cellular, or cellular-like, communication system is carried out through use of a portable wireless device, sometimes referred to as a mobile station. A portable wireless device includes transceiver circuitry permitting the sending and receiving of information. The portable wireless device is typically of compact dimensions and low weight to facilitate hand carriage of the device. A wireless device, when of such dimensions, is conveniently carried by the user, stored, e.g., in a pocket or purse of the user when not used and readily available for use whenever needed.

Some wireless devices provide additional functionalities in addition to the functionalities provided by the transceiver circuitry. Wireless devices that provide the additional functionalities form multi-functional devices, capable of performing multiple functions.

For instance, a wireless device sometimes includes camera functionality. The camera functionality, implemented, for instance, through use of a camera module, provides for the capturing of an image. A camera module is often capable of capturing both a still image and a video, formed of a sequence of image stills. Once captured, i.e., recorded, the data forming the image is subsequently displayable at either a local or remote image display element. When implemented at a wireless device, data representative of the captured image can be transmitted by way of a radio communication system in which the wireless device is operable to a remote location for storage, display, or other use thereat. A camera module sometimes also provides for the recording of video sequences, such as video sequences formed of a sequence of images. A wireless device having such capability is also typically capable of transmitting a recorded video sequence to a remote location by way of the radio communication system in which the wireless device is operable.

A camera module, either forming part of a wireless device, another type of device, or a standalone device, implemented as a digital module, utilizes digital techniques to capture a native response of incident light of a scene or subject and converts the light energy of the incident light into a digital signal, typically in the form of RGB (red-green-blue) data. The native response is sometimes represented as a bayer image that exhibits different RGB ratios at each pixel location of the sensed and captured image. The ratio at each pixel location is completely dependent upon the illuminating light source and of the scene. The RGB ratios are adjusted by an adjustment factor so that neutral subjects of the captured images appear truly neutral, ranging between white through gray and black, without any color cast, which sometimes appears as a somewhat yellow or blue color.

This adjustment, referred to as white balancing (WB) is, however, conventionally carried out using an estimation or guess of the amount of color cast in a captured image. White balancing of the captured image is then performed, using the guess or estimate. While estimation sometimes utilizes algorithms to analyze RGB distributions to estimate the amount of color casts in the captured image, such algorithms are often inaccurate, particularly when there are mixed light sources, especially when the light sources are of equal proportions. An improved manner by which to provide for white balancing of captured images is therefore needed.

It is in light of this background information related to camera functionality that the significant improvements of the present disclosure have evolved.

DETAILED DESCRIPTION

Figure 1:
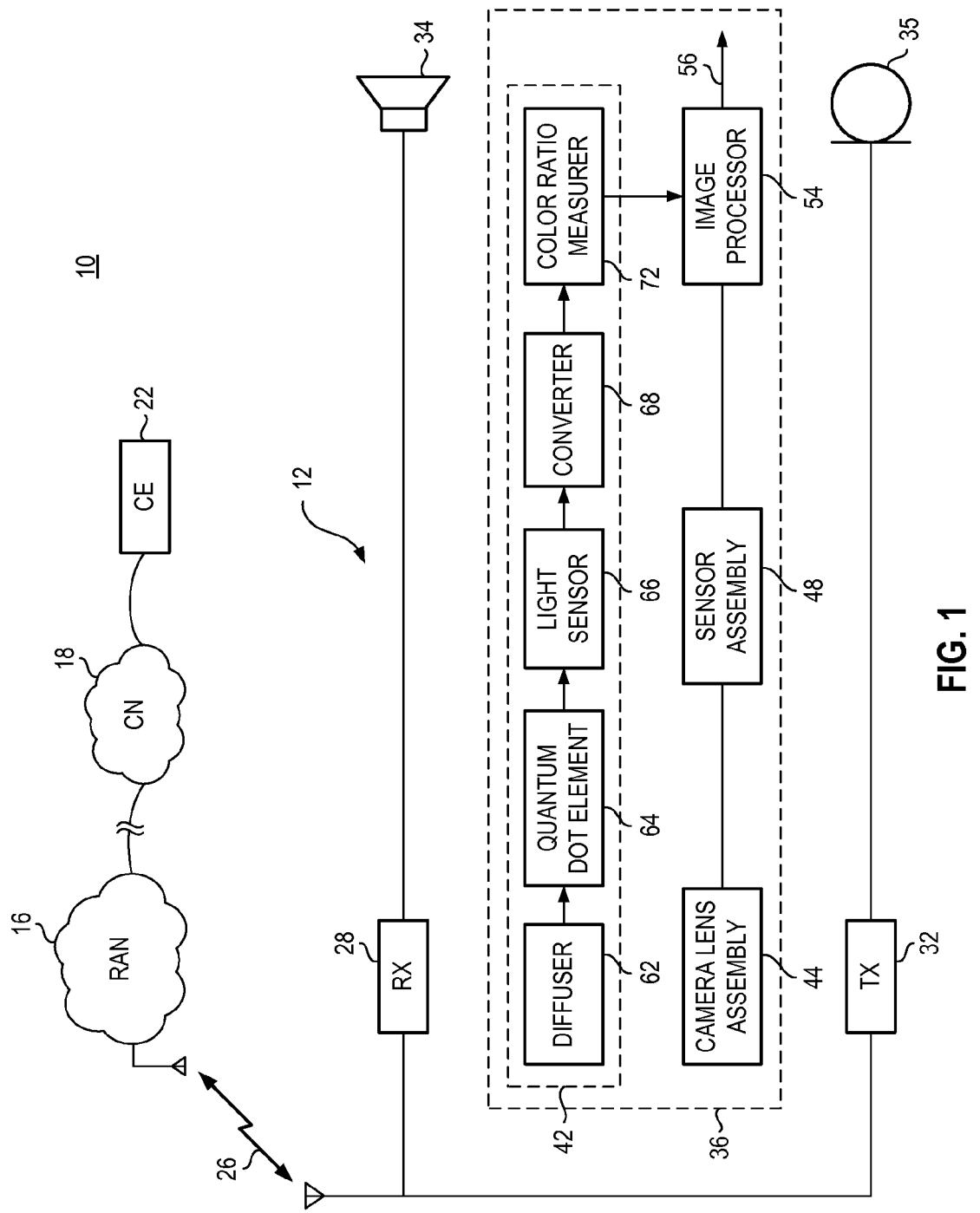
FIG. 1 illustrates a functional block diagram of a radio communication system including a wireless device having camera functionality that includes an implementation of the present disclosure as a portion thereof.

The present disclosure, accordingly, advantageously provides an apparatus, and an associated method, for white balancing a photographic, or other captured, image.

Through operation of an implementation of the present disclosure, a manner is provided to obtain a color response provided by a quantum dot element upon which light associated with the image is incident.

In one aspect of the present disclosure, the color response is measured and used to select the white balancing that is to be applied to the image. That is to say, the selection of the white balance is made based upon a quantitative measurement that is representative of the incident light.

In another aspect of the present disclosure, a quantum dot element is utilized. The quantum dot element includes a material that displays unique optical properties, i.e., the emission of photons under excitation. The photonic emissions exhibit a color that is related, amongst other things, to the size of the quantum dot element, and also to a characteristic of the incident light. The quantum dot element is positioned to receive light, such as light associated with a scene or subject that is captured during camera operation.

In another aspect of the present disclosure, light incident upon the quantum dot element is absorbed by the quantum dot element. The quantum dot element, in response, produces a color response, such as an RGB (red, green, blue) response.

In another aspect of the present disclosure, the color response formed by the quantum dot element exhibits a color ratio that is a direct function of the illuminating source, i.e., the light incident upon the quantum dot element. The illuminating source illuminates the subject or scene, and the resultant light energy, representative of the subject or scene is detected by the quantum dot element. Because the response is a direct function of the light incident upon the quantum element, a quantitative indication of the coloring of a captured image can be made.

In another aspect of the present disclosure, a diffuser is positioned to diffuse light prior to incidence upon the quantum dot. That is to say, a diffuser is provided and positioned between the subject and the quantum dot element. The diffuser is formed of the material that scatters light. By scattering the light, a focused image is not incident upon the quantum dot element. Rather, the diffuser acts to transmit the color of the light source rather than the color of any subject within the scene. As the color of the light source is incident upon the quantum dot element, the color response generated by the quantum dot is representative better of the color of the source, which better provides an indication of the color response that can be used to select white balancing of a corresponding captured image.

In another aspect of the present disclosure, the color response of the quantum dot element is an RGB response or a color response of another color or combination of colors.

In another aspect of the present disclosure, a converter is provided for converting the color response formed by the quantum dot element into electrical form. The converter, for instance, forms digital sequences or codes that are of values that are based upon the color response. That is to say, the converter converts absorbed photons into electrons, and the electrons are converted into digital codes. A separate digital code is formed, for instance, for each color, such as red, green, and blue, or other color or combination.

In another aspect of the present disclosure, a controller is provided with the digital codes formed by the converter. The controller utilizes the values of the digital codes in the determination of the color ratios that are to be applied to a captured image in order to achieve an appropriate white balance. The controller unit, for instance, determines RGB ratios, and the RGB ratios are applied to a captured image.

In another aspect of the present disclosure, the RGB, or other color, ratios are determined prior to the capture of an image. When the image is subsequently captured, white balancing is performed upon the captured image in conformity with the ratios determined by the controller, thereby to change the color cast of the captured image and form a modified, captured image that is of improved color characteristics.

In another aspect of the present disclosure, an integrated device, formed of the quantum dot material, diffuser, converter, measurer, controller, and an image sensor for capturing an image is provided. The integrated device comprises, or forms part of, a camera module, implemented either as a standalone device or as part of the functionality of a multifunctional device, such as a wireless device that includes camera functionality.

Thereby, a manner by which better to facilitate modification of a captured image to white balance the image is provided.

In these and other aspects, therefore, an apparatus, and an associated method, is provided for facilitating selection of a white balance indicia by which to adjust a captured image. A quantum dot element is positionable to absorb incident light of a scene associated with the captured image. A measurer is configured to measure a color ratio responsive to a characteristic of the quantum dot element subsequent to the absorption of the incident light. The color ratio is usable to select the balance indicia.

Turning first to FIG. 1, a communication system 10 provides for communications with communication devices, here represented by a wireless device 12.

In the exemplary implementation, the communication system 10 forms a multi-user, wireless communication system, such as a cellular communication system operable in general conformity with the operating protocols of an appropriate cellular communication system operating standard. More generally, the communication system 10 is representative of any of various communication systems, both wireless communication systems and wire line communication systems, in which information is communicated. Additionally, while the functionality that shall be described below with respect to an implementation as part of the device 12, the functionality is also implementable at a standalone device, i.e., a device that is not used to communicate by way of a communication system.

The communication system includes a network part that here includes a radio access network (RAN) 16 and a core network (CN) 18. A communication endpoint (CE) 22 is connected in communication with the core network and is representative of any of various communication devices that sends or receives information.

A communication path is formable between the communication endpoint 22 and the wireless device 12. The path is formed through the core network 18, the radio access network 16, and upon radio channels 26, represented by the arrow in FIG. 1, defined upon a radio air interface extending between the network part and the wireless device.

The device 12 includes, here, radio transceiver circuitry, represented by a receive (Rx) part 28 and a transmit (Tx) part 32. The receive part 28 detects and operates upon information sent to the device 12, and the transmit part 32 operates upon and causes transmission of information sourced at the device 12. Transducers 34 and 35 are connected to the Rx and Tx parts 28 and 32, respectively.

The wireless device 12 also includes camera functionality that provides for the capturing of images and video sequences, formed of successive images. The camera functionality is provided, at least in part, by a camera module, typically housed at the housing of the wireless device together with the transceiver circuitry. Images captured by the camera functionality are displayable, e.g., at a display element of the device 12 or viewed elsewhere. The camera module, here represented at 36, is formed of functional elements and includes the apparatus 42 of an implementation of the present disclosure.

As mentioned previously, white balancing of a captured image is generally required in order to correct for a color cast upon neutral subjects so that the neutral subjects do not appear, e.g., yellowish or bluish in color. The conventional mechanisms by which to provide for white balancing utilize a guess or estimate as to the amount of balancing that should be applied to alter the color cast of the captured image. Because the white balancing is based merely upon the guess or estimate, the resultant balancing is sometimes inaccurate, particularly when there are mixed light sources in the same scene, i.e., image.

The apparatus 42 includes elements that provide for the determination of the amount of white balancing based upon a quantitative measurement, thereby facilitating improved white balancing of a captured image.

The camera module 36 includes a camera lens assembly 44 that includes a camera lens and a sensor assembly 48. The sensor assembly 48 includes a plurality of sensors arranged in groups of red, green, and blue (RGB) pixels. The pixels sense light of a subject in a scene within sight of the camera lens assembly. The one or more lenses of the camera lens assembly focus the scene sighted by the camera lens assembly at the sensors of the sensor assembly. In one implementation, the camera lens assembly is manually focused. In another implementation, the camera lens assembly is automatically focused utilizing an autofocus mechanism.

Electrical representations of sensed light energy that is sensed by the sensors of the sensor assembly are provided to an image processor 54. The image processor performs various processing functions upon the sensed and captured image, represented by the electrical representations provided to the image processor. White balancing is amongst the functions performable by the image processor. Here, when white balancing is performed, a white-balanced image is formed on the line 56. The white balanced image is stored, displayed, or transmitted elsewhere, such as by way of the transmit part 32.

The apparatus 42 includes functional elements, implementable in any desired manner, including hardware elements, firmware elements, program code executable by processing circuitry, and combinations thereof.

The apparatus 42 here includes a diffuser 62, a quantum dot element 64, a light sensor 66, converter 68, and a color ratio measurer 72. In the exemplary implementation, the elements of the apparatus 42 are embodied at a common element. In other implementations, the elements are distributed across more than one element. In another exemplary implementation, the elements of the apparatus 42 are embodied together with the sensor assembly and, e.g., form part of, or are placed together with, a dye upon with the pixels of the sensor assembly 48 are formed.

The quantum dot element 64 is positioned to be oriented in the general direction of the scene or subject that is cited by the camera lens assembly. The diffuser 62 is positioned in front of, that is, between the quantum dot element 64 and the subject sighted by the camera lens assembly. The diffuser is formed of a material that scatters light, here the light of the subject or scene cited by the camera lens assembly so that unfocused light is incident upon the quantum dot element. The diffuser acts, by scattering the light thereon, to accentuate the color of the light source rather than the color of subjects within the scene.

The quantum dot element is formed of a material that exhibits a characteristic that is dependent upon light incident thereon. The quantum dot element includes, for instance, nano particles of a semiconductor material that exhibit a unique optical property, i.e., having an intensity, or other characteristic, dependent upon the light incident thereon. The characteristic is a color response, which, in the exemplary implementation forms an RGB (red, green, blue) response. In other implementations, the color response formed by the quantum dot element is of another color, or color combination, response. The light sensor 66 is positioned to sense the color response exhibited by the quantum dot element. The light sensor, in turn, generates an electrical value or signal that is provided to the converter 68.

The converter 68 converts the electrical value or signal into digital codes that are representative of the electrical indications of the photonic emissions. When the color response of the quantum dot element forms an RGB response, the converter generates a digital code for each of the different colors, i.e., a first digital code for the red response, a second digital code for the green response, and a third digital code for the blue response.

The digital codes formed by the converter 68 are provided to the color ratio measurer 72. The color ratio measurer measures, or otherwise determines, color ratios based upon the digital codes provided thereto. In the exemplary implementation in which the quantum dot element forms an RGB response and the converter forms red, green, and blue codes, the color ratio measurer forms RGB ratios that are provided by way of the line 76 to the image processor 54. In the exemplary implementation, the measurer 72 forms a red/green ratio and a blue/green ratio. In other implementations, other ratios and numbers of ratios are formed. Indications of the sensed image are also provided to the image processor. The image processor utilizes the ratios provided to white balance the image sensed by the sensor of the sensor assembly 48.

Because the RGB, or other color, ratio is based upon quantitative indications of the light of the scene, the color ratio is not based upon an estimate or a guess, and the resultant white balancing is able more accurately to be carried out.

Figure 2:
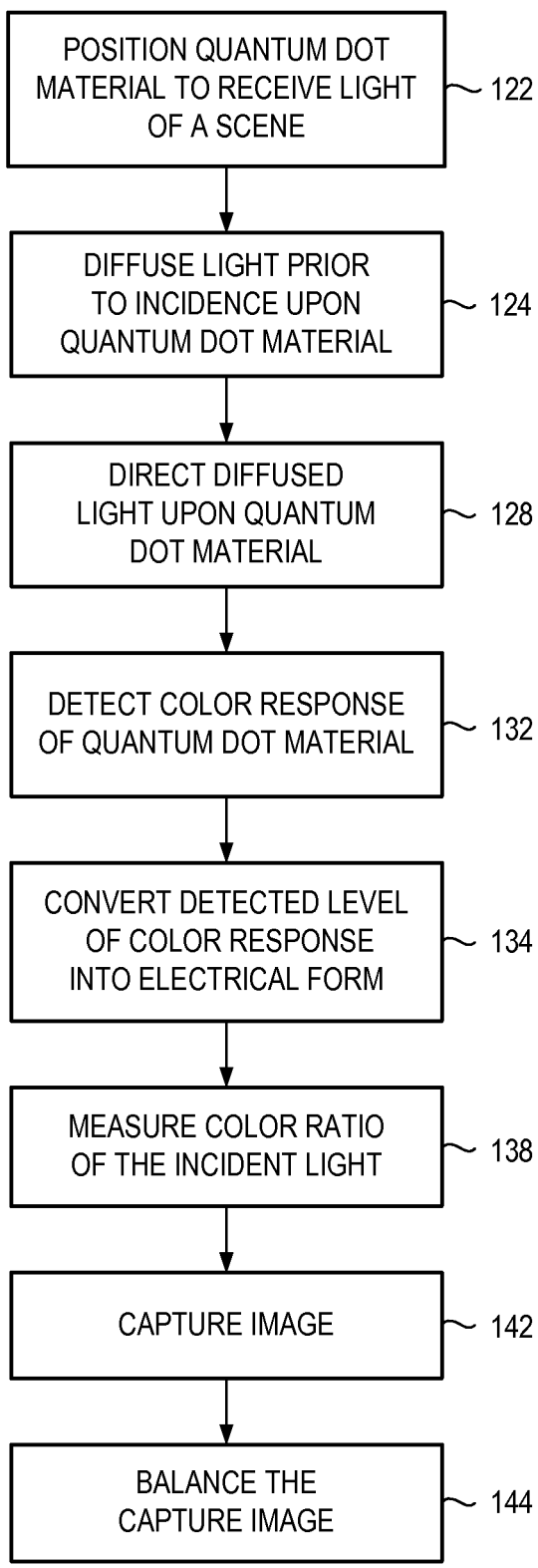
FIG. 2 illustrates a process diagram representative of the process of operation of an implementation of the present disclosure.

Turning next to FIG. 2, a process 116 provides for white balancing of a captured image using a quantitative measurement of the color of incident light. Because a quantitative measurement is used, inaccuracies resulting from conventional estimation or guess of the amount of white balancing to apply to the captured image are reduced.

First, and as indicated by the block 122, a quantum dot element is positioned or oriented to receive light of a scene that is to be captured during camera operation of a camera device. A diffuser is positioned between the quantum dot element and the scene such that light is diffused, indicated by the block 124, to cause scattering of the light that is incident on the diffuser.

Then, and as indicated by the block 128, the diffused light is directed upon the quantum dot element. Because the light is diffused, the light incident upon the quantum dot element is representative of the color of the light source of the scene.

The incidence of the light upon the quantum dot element causes the quantum dot material of the element to absorb photons of energy. In turn, the quantum dot material exhibits a color response, and the characteristics of the color response are detected, indicated by the block 132. And, as indicated by the block 134, the detected color response is converted into electrical form. Digital codes, for instance, are formed.

Electrical representations into which the characteristics of the color response are converted are used to measure, or otherwise determine, indicated by the block 138, the color ratio of the light incident upon the quantum dot element.

An image is captured, indicated by the block 142, by camera functionality, such as a camera module of a camera. Once captured, and as indicated by the block 144, the color ratio is used to white balance the captured image. In one implementation, capturing of the image at the block 142 is performed concurrently with any of the operations 128-138.

The capturing of the image at the block 142 is shown subsequent to operations that provide for and result in the measurement of the color ratio. The image is captured at any time, that is to say, as shown, subsequent to the measurement of the color ratios as well as prior to, or concurrent with, the measurement of the color ratios and associated operations.

Figure 3:
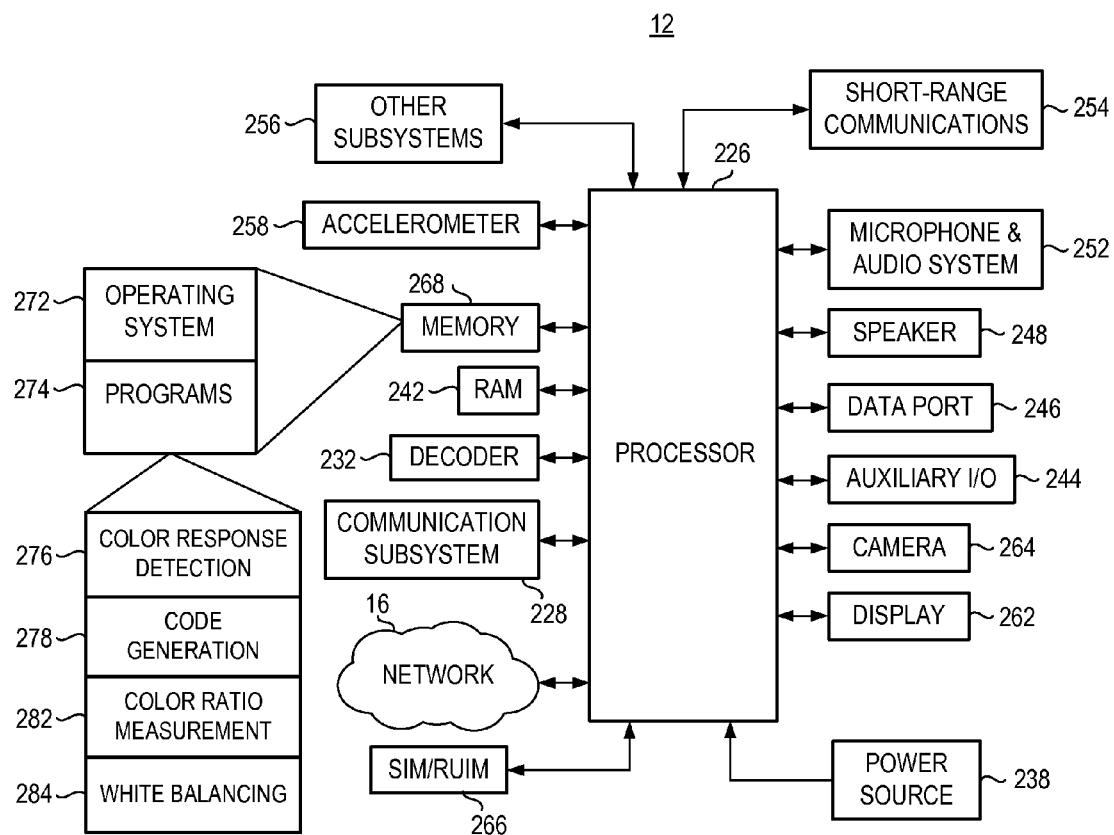
FIG. 3 illustrates a functional block diagram of an implementation of the wireless device shown in FIG. 1.

FIG. 3 illustrates an exemplary device 12. An implementation of the device here forms a multi-functional, wireless device having data communication capability. The device 12 includes a processor 226 that controls operation of the device 12. The processor, for instance, controls voice, data, and command communications, which are implemented by a communication subsystem 228. The communication subsystem 228 includes radio transceiver elements, such as a radio receiver and a radio transmitter. The communication subsystem 228 is used, amongst other things, pursuant to initiation and support of an active voice call or other data communication session. The communication subsystem is formed in any desired manner using any of combination of hardware, software, and firmware to perform various designated functions. The software is divided into software modules that are formed of program code. Software in one module is able to share or to call upon functions of another module during operation.

When the device 12 is operated pursuant to a communication service, the data received at the device is processed by a decoder 232. The decoder performs operations including decompression and decryption of the data. The device 12 also receives information from, and sends information to, the network 16. The network 16 is of any of various types of networks. Any of a variety of formats and protocols are used by the network 16.

A power source 238 provides power to operate the elements of the device 12 to permit the various functions of the device to be performed. The power source 238 comprises, for instance, a battery power supply or forms a port to permit connection to an external power supply.

The processor 226 also interacts with other elements of the device 12. The processor 226, for instance, interacts with a random access memory (RAM) 242, an auxiliary input/output (I/O) subsystem 244, a data port 246, a speaker 248, a microphone and audio system 252, a short-range communication system 254, and other subsystems 256, an accelerometer 258, a display 262, and a camera module 264.

The processor 226 also interacts with a subscriber identity module or removable user identity module (SIM/RUIM) 266. Identification information is alternately stored at an internal memory of the device, such as the memory 268. The device 12 further includes an operating system 272 and other software programs 274, which are formed of program code. The operating system 272 and the software program 274 are executed by the processor 226 during operation of the device 12. The software programs, here include a color response module 276, a code generation module 278, a color ratio measurement module 282, and a white balancing module 284. The software modules 276-284 are operative to carry out functions described above with respect to use of the color response of the quantum dot element 64 of the apparatus 42, shown in FIG. 1, in the white balancing of a captured image.

Figure 4:
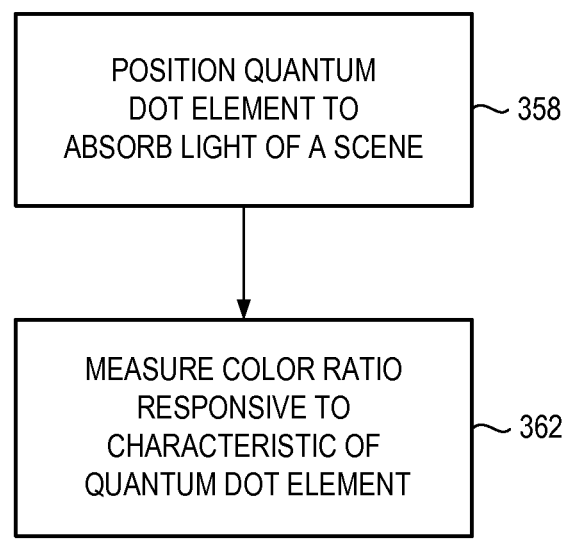
FIG. 4 illustrates a method flow diagram representative of the method of operation of an implementation of the present disclosure.

FIG. 4 illustrates a method representative of the method of operation of an implementation of the present disclosure. The method facilitates selection of a balance indicia by which to adjust a captured image.

First, and as indicated by the block 358, a sensor is positioned proximate to a quantum dot element that is positioned to absorb incident light of a scene associated with the captured image.

Then, and as indicated by the block 362, a color ratio is measured responsive to a characteristic of the quantum dot element subsequent to absorption of the incident light. The color ratio is usable to select the balance indicia.

Thereby, a manner is provided by which quantitatively to determine the white balancing that should be applied to a captured image to improve the color contrast thereof. Because a quantitative measurement or determination is utilized in the selection of the white balancing, the inaccuracies that sometimes result when using guesses or estimates of the color ratio associated with a captured image do not result in a poor color cast of the resultant image. Additionally, because the color ratio can be measured as the image is captured, the white balancing can be more quickly completed.

Presently preferred implementations of the disclosure and many of improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus for selecting a balance indicia to adjust an image, said apparatus comprising:
   a diffuser configured to diffuse light of a scene associated with the image
   a quantum dot element positioned to have diffused light, diffused by said diffuser, incident thereon;
   a processor configured to:
      detect a quantum-dot-element color response of said quantum dot element, the quantum-dot-color response representative of the diffused light incident on said quantum dot element and of the scene associated with the image; and
      balance the image based on the quantum-dot-element color response.

2. The apparatus of claim 1 wherein said processor is further configured to measure a color ratio of the color response and wherein said processor is configured to balance the image using the color ratio.

3. An apparatus for selecting a balance indicia to adjust an image, said apparatus comprising:
   a diffuser configured to diffuse light of a scene associated with the image;
   a quantum dot element for absorbing incident light, diffused by said diffuser, and representative of the scene associated with the image;
   a measuring module configured to measure a color ratio responsive to a characteristic of said quantum dot element subsequent to absorption of the incident light, the color ratio useable to select the balance indicia.

4. The apparatus of claim 3 wherein said measuring module is configured to measure the color ratio concurrent to capturing of the image.

5. The apparatus of claim 3 wherein said quantum dot element is configured to generate a RGB (Red Green Blue) response in response to absorption of the incident light, the RGB response forming the characteristic of said quantum element.

6. The apparatus of claim 4 wherein said measuring module is configured to measure a RGB ratio.

7. The apparatus of claim 3 further comprising a converter configured to convert the characteristic of said quantum dot element into electrical form.

8. The apparatus of claim 7 wherein said converter is configured to convert the characteristic of said quantum dot element into a digital sequence.

9. The apparatus of claim 8 wherein the digital sequence comprises a value proportional to the characteristic of said quantum dot element.

10. The apparatus of claim 9 wherein the characteristic of said quantum dot element comprises a first color characteristic and a second color characteristic.

11. The apparatus of claim 10 wherein the digital sequence comprises a first digital sequence proportional to the first color characteristic and a second digital sequence proportional to the second color characteristic.

12. A method for selecting a balance indicia to adjust an image, said method comprising:
- diffusing light of a scene associated with the image at a diffuser to form diffused light of the scene;
- receiving the diffused light of the scene at a quantum dot element; and
- measuring a color ratio at a color ratio measurer based on the diffused light received at the quantum dot element, the color ratio useable to select the balance indicia.

13. The method of claim 12 wherein said measuring comprises measuring the color ratio concurrent to capturing of the image.

14. The method of claim 12 wherein the quantum dot element is configured to generate a RGB (Red Green Blue) response in response to receiving the incident light, the RGB response forming a characteristic of the quantum element.

15. The method of claim 14 wherein said measuring comprises measuring a RGB ratio.

16. The method of claim 12 wherein the quantum dot element is configured to exhibit a characteristic that is a function of the incident light.

17. The method of claim 12 further comprising converting a property of the received incident light of said quantum dot element into electrical form.

18. The method of claim 17 wherein said electrical form comprises a digital sequence.

* * * * *